US008382890B2

(12) United States Patent
Barreto et al.

(10) Patent No.: US 8,382,890 B2
(45) Date of Patent: *Feb. 26, 2013

(54) METHOD FOR PREPARING COATED MATERIALS BASED ON BITUMINOUS PRODUCTS AND USES THEREOF

(75) Inventors: Gilles Barreto, Messimy (FR); Lionel Grampre, Sainte Foy les Lyon (FR)

(73) Assignee: CECA S.A., La Garenne Colombes (FR)

( * ) Notice: Subject to any disclaimer, the term of this patent is extended or adjusted under 35 U.S.C. 154(b) by 438 days.

This patent is subject to a terminal disclaimer.

(21) Appl. No.: 12/597,215

(22) PCT Filed: Apr. 28, 2008

(86) PCT No.: PCT/FR2008/050764
§ 371 (c)(1),
(2), (4) Date: Apr. 19, 2010

(87) PCT Pub. No.: WO2008/148974
PCT Pub. Date: Dec. 11, 2008

(65) Prior Publication Data
US 2010/0192805 A1 Aug. 5, 2010

(30) Foreign Application Priority Data
Apr. 26, 2007 (FR) .................................. 07 54724

(51) Int. Cl.
*C08L 95/00* (2006.01)
(52) U.S. Cl. .................................. 106/281.1; 106/284.1
(58) Field of Classification Search ................ 106/281.1, 106/284.1
See application file for complete search history.

(56) References Cited

U.S. PATENT DOCUMENTS

| | | | |
|---|---|---|---|
| 2,693,425 A | 11/1954 | Hardman | |
| 3,270,631 A * | 9/1966 | Bower | 106/277 |
| 4,371,400 A | 2/1983 | Muller et al. | |
| 5,743,950 A | 4/1998 | Hendriks et al. | |
| 5,820,663 A | 10/1998 | Miller et al. | |
| 5,990,206 A | 11/1999 | Tanaka et al. | |
| 6,024,788 A | 2/2000 | Tomioka et al. | |
| 6,136,082 A * | 10/2000 | Barreto et al. | 106/277 |
| 6,261,356 B1 | 7/2001 | Isobe et al. | |
| 6,588,974 B2 | 7/2003 | Hildebrand et al. | |
| 6,846,354 B2 | 1/2005 | Larsen et al. | |
| 7,732,511 B2 * | 6/2010 | Barreto et al. | 524/68 |
| 7,951,858 B2 * | 5/2011 | Barreto et al. | 524/68 |
| 2004/0033308 A1 | 2/2004 | Barthel et al. | |
| 2005/0076810 A1 | 4/2005 | Barthel et al. | |
| 2006/0236614 A1 | 10/2006 | Antoine et al. | |
| 2006/0240185 A1 | 10/2006 | Antoine et al. | |
| 2007/0151480 A1 * | 7/2007 | Bloom et al. | 106/220 |
| 2009/0203815 A1 * | 8/2009 | Barreto et al. | 524/68 |

FOREIGN PATENT DOCUMENTS

| | | |
|---|---|---|
| EP | 0157210 | 10/1985 |
| EP | 1323867 | 7/2003 |
| WO | WO 2005/100480 | 10/2005 |

OTHER PUBLICATIONS

Carvalho, Louis C. C. "Sugar/Alcohol as an Industrial Raw Material" BDI, 1-10, Jul. 2006.
European Committee for Standardization "Bituminous Mixtures—Test Methods for Hot Mix Asphalt—Part 3: Bitumen Recovery: Rotary Evaporator" EN 12697-3, Apr. 2003.

* cited by examiner

*Primary Examiner* — Helene Klemanski
(74) *Attorney, Agent, or Firm* — Smith, Gambrell & Russell, LLP

(57) ABSTRACT

The invention relates to mixtures of bituminous products with granulates in the form of coated materials that can be used in the field of sealing, building and maintenance of road coatings, sidewalks and aviation strips, and to road coatings, sidewalks, cycling corridors, parking areas and aviation strips.

15 Claims, No Drawings

METHOD FOR PREPARING COATED MATERIALS BASED ON BITUMINOUS PRODUCTS AND USES THEREOF

FIELD OF THE INVENTION

The present invention relates to the field of sealing, construction and repair of road coverings, pavements and aircraft runways where mixes of aggregates and bituminous products are used.

Within the context of the present invention, the expression "bituminous products or binders" is understood to mean natural bitumen and bitumens derived from a mineral oil and the resulting mixes thereof. Bitumens obtained by cracking and tars are also considered here as bituminous products within the meaning of the present invention, and also the mixes which may result therefrom. Blown bitumens—residues of distillation, vacuum distillation or precipitation (for example obtained by propane precipitation)—are examples considered within the context of this invention.

Also considered here are bitumens diluted using petroleum solvents, bitumens diluted using vegetable oils and polymer bitumens. The bituminous products listed above are anhydrous, as much as is possible on the industrial production scale in question.

Within the meaning of the invention, the term "aggregates" is understood to mean divided mineral materials from quarries, asphalt mixture aggregates, milled fragments, clinker or breeze, scoria and slags, concrete demolition recycling products and also the mixes that result therefrom. According to the present invention, inorganic or organic fibres may be incorporated into the mix of aggregates and bituminous products. By way of example, these fibres may be glass fibres, carbon fibres, cellulose fibres, cotton fibres, polypropylene fibres, polyester fibres, polyvinyl alcohol fibres, polyvinyl acetate fibres, polyamide fibres or metallic fibres.

In everything that follows, the mix of aggregates and bituminous products will also be referred to as a "asphalt mixture".

Many processes for producing mixes of aggregates and bituminous products are currently used. They may be classified in three separate groups: production processes at ambient temperature, processes at a temperature above 100° C. and processes at intermediate temperatures between ambient temperature and 100° C., that is to say for which it is necessary to supply thermal energy for the production of the asphalt mixture, while allowing the presence of liquid water in the asphalt mixture.

The processes for producing asphalt mixtures at ambient temperature are those for which the production of the mix of bituminous binder and aggregates is carried out without a supply of thermal energy. Mention may be made of the coating of aggregates using a bitumen to which a volatile solvent has been added so as to make it sufficiently fluid at ambient temperature in order to allow good coating of the aggregates. The asphalt mixture is subsequently used by means of suitable equipment for transporting, laying and compacting it. This technique is tending to disappear as it consumes solvents in large quantities, solvents which, by evaporating into the atmosphere, create pollution that can be avoided by other techniques.

Mention may also be made of the production techniques using, as a bitumen carrier, bitumen emulsions or dispersions in an aqueous solvent. The bitumen emulsion or dispersion is mixed with the aggregates so to ensure that it is properly coated. The mix obtained is then used by means of suitable equipment for transporting, laying and possibly compacting it. These techniques have the advantage of concentrating the phase where high temperatures are involved in a plant where the emulsion is manufactured. The aggregates used at ambient temperature may contain water. These techniques therefore do not require heat treatment of the aggregates, which limits the consumption of energy during the production of the asphalt mixture and the production of dust. Furthermore, since the mix is at ambient temperature, that is to say between around 5° C. and 30° C., the emissions of volatile organic compounds are very low. However, the mechanical performance obtained with these mixes is, in general, inferior to that obtained with other techniques described below, especially at a young age. This technique has found its niche in road repair for roadways subjected to light or moderate traffic, for example secondary roads, parking areas of individual or public housing, or of buildings, cycle paths, etc.

Processes at a temperature above 100° C. use the bitumen in anhydrous form, in a sufficiently fluid state to ensure that the aggregates are properly coated. So as to ensure good coating and good final mechanical properties, it is conventional to dry the aggregates and to bring them to a temperature close to that of the bitumen. There are two main types of processes: continuous processes and batch processes.

In a continuous process, the aggregates are fed continuously into a drum that has a burner for heating the aggregates by flame radiation. In a zone of the drum not exposed to the radiation, the aggregates coming from the drying zone are coated with liquid bitumen before exiting and being conveyed to a buffer storage hopper.

In a batch process, a mixer maintained at high temperature is used, into which various grades of the aggregates are poured in batches. These are homogenized by mixing and then the bitumen is added by pouring it in. After mixing, the mix of aggregates and bituminous product obtained may be stored in a hopper. The mix obtained is then used by means of suitable equipment allowing it to be transported, spread and optionally compacted.

The mix obtained is transported and deposited at a high enough temperature to ensure proper spreading, proper smoothing and optionally proper compacting. The choice of process temperatures depends on the class of bitumen (therefore, on its penetration index or penetrability) and is generally controlled. The inhomogeneity of the temperatures in the aggregates and mixes thereof with bituminous products leads to a disparity in the temperatures, which are averaged with an inaccuracy of ±5° C.

In the United States of America, for hot mix asphalts, the reference standard is the AASHTO PP28 standard. It indicates, as a function of the viscosity of the bituminous product, the temperature range of aggregates and bituminous product for mixing, for compacting.

For bituminous concretes and bitumen-bound gravels in France for example, the temperatures of the mixes of aggregates and bituminous products on leaving a plant, with a pure bitumen having a penetration index of 35/50, are generally 150° C. to 170° C., or even from 160° C. to 180° C. when the weather conditions are harsher; for spreading, the temperature of the mixes of aggregates and bituminous products is above 130° C.

French standard NF P 98-150 from January 2008 constitutes the reference standard for implementing roadway structures, binder courses and wearing courses made of hydrocarbon-based asphalt mixtures, French standard NF P 98-130 from November 1999 constitutes the reference standard for semi-coarse bituminous concretes and French standard NF P 98-138 from November 1999 constitutes the reference standard for bitumen-bound gravels.

These standards impose a temperature on leaving the plant of 150° C. to 170° C. and a minimum spreading temperature of 130° C. for a pure 35/50 penetration index bitumen, and a temperature for a pure 70/100 penetration index bitumen on leaving the plant of 140° C. to 160° C. and a minimum spreading temperature of 120° C. There is no constraint on the compacting temperature, but this is carried out immediately after spreading the mix so as to have a start-off compacting temperature as close as possible to the temperature at which the mix was spread. Keeping the bitumen in a sufficiently liquid and therefore sufficiently hot state allows the asphalt mixture to retain sufficient fluidity for these operations to be carried out correctly.

These two hot-mix processes, which use continuous or batch plants, are the ones most often employed when considering the tonnage of bitumen consumed worldwide, whether for road construction, road repair or in the field of sealing. They form the reference processes in the current state of the art. They are in fact the two most robust processes on an industrial scale.

As with all the techniques presented here, it is necessary to have precise control over the grade of the aggregates, the quality of the bitumen, which must meet the country-specified standards, and the quality of the process, which is represented inter alia by the quality of the mixing determined by the geometry of the mixing zone, by the mixing energy, by the speeds of the moving parts and also by the various durations of the process.

Few specific parameters have to be also checked in order to ensure correct execution of the operations and it is found that the behaviour of the asphalt mixture remains quite stable in the presence of fluctuations. The simple additional check of the temperature of the aggregates and of the bitumen during production and of the asphalt mixture during spreading makes it possible to ensure that the operations are correctly executed. If we wish to make a comparison, the ambient-temperature techniques described above require the additional control of parameters such as the pH, the water content, the additive content and the chemical nature of the additives, the position for addition of these additives, the chemical nature of the aggregate and sometimes its age.

However, the two processes for manufacturing asphalt mixtures at a temperature above 100° C. described above are not without defects:

- all bitumens do not give the same properties to the asphalt mixtures produced: the two main classes of naphthenic bitumen and non-naphthenic bitumen are distinguished, with naphthenic bitumen having an advantage. The latter gives, at temperatures of aggregates and bitumen that are identical or close, a better fluidity to the mix with the aggregates. In practice, this is also expressed by a better comptactability and a better cohesion. It is also observed that it is possible to lower the temperature of the mix of aggregates and of naphthenic bitumen by 5 to 15° C. relative to the case where a non-naphthenic bitumen is used, while retaining an identical fluidity to the mix of non-naphthenic bitumen and aggregates. Here too, there is an unmet need to improve the performance of mixes of non-naphthenic bitumen and aggregates;
- the heating and drying of the aggregates result in a substantial consumption of fossil, and therefore non-renewable, fuel. When the process is analysed from the thermal standpoint, it is realized that only the bitumen is initially hot upon entering the mixing plant; the aggregates, which generally constitute 90 to 96% of the mass of the asphalt mixture, are at ambient temperature. The step of temporarily heating the aggregates is carried out in order to ensure that there is a high-quality bitumen coating and also to ensure proper implementation. However, the product installed acquires beneficial properties only once it has cooled. Ail the energy expended is finally released into the atmosphere;
- concomitantly, large quantities of greenhouse gas (GHG) and dust are generated, said dust being partially collected and reinjected into the coating circuit. The implementation itself results in the emission of volatile organic compounds on the spreading site, which have an action on the greenhouse effect. It is possible to attach capture devices to the finisher, but this requires current workshops to be reequipped, and it does not eliminate the emissions emanating from the covering blade downstream of the finisher, and increases the price of the final product;
- the working conditions are difficult because of the thermal radiation and the gas emissions; and
- when, for uncontrollable reasons, such as deterioration in the weather conditions, the arrival of nightfall, a longer transport time from the plant to the site for example, the temperature of the premanufactured asphalt mixture drops below a certain limit, the mix can no longer be correctly applied, resulting in porosity and mechanical performance drawbacks. The robustness of the process is limited. To offset this effect, it is common practice to produce the asphalt mixture at temperatures above those recommended in the official documents (standards). This amounts to exacerbating the first three drawbacks mentioned.

To reduce the extent of the last four drawbacks mentioned above (high temperature for drying the aggregates, GHG, importance of thermal radiation and gas emissions, implementation conditions that are not very controllable), a person skilled in the art might be led to envisage reducing the temperature of manufacture of the asphalt mixture relative to the regulated temperature ranges, while trying to modify the process for manufacturing the asphalt mixture as little as possible relative to the processes at a temperature above 100° C., and this being, in particular, for the purpose of minimizing the costs. This would then result in a decrease in the implementation temperature relative to the regulated temperature ranges.

However, a temperature of the mix of bituminous product and aggregates below the current standards or regulations, and especially below the temperatures customarily used, would lead, with no other modification, to a lack of coating of the less hot aggregates by the bituminous product and, during the implementation, to a problem of fluidity of the mix, that is to say a lack of deformability of the mass of the mix. This would result in a lack of supply of the finisher, in a lack of evenness and of compactness. The compactness is commonly measured by the void percentage using a radioactive probe, for example according to the standard NF P98-241-1 of August 1993.

PRIOR ART

U.S. Pat. No. 5,820,663 claims a composition containing bitumen and an adhesion dope which is the phosphoric ester of a monohydric fatty alcohol surfactant having an HLB between 8 and 18. The presence of this adhesion dope makes it possible to limit the separation between bitumen and aggregates in the presence of water compared to the case of no additive in the bitumen. The examples are laboratory tests used to demonstrate the performance of the additive that consist of an odour test of the additivated bitumen and a separation test between additivated bitumen and aggregates in the presence of water, after having mixed aggregates and additivated bitumen at temperatures above 135° C. for an 85/100 penetration index bitumen. These temperatures conform to the current standards.

U.S. Pat. No. 6,024,788 claims a composition containing bitumen and an adhesion dope which is the phosphoric ester of an ethoxylated and/or propoxylated fatty alcohol surfactant, the fatty chain having certain structure characteristics and the ethoxy and propoxy units being repeated a certain number of times. It is indicated that this composition has an improved adhesion to the aggregates, that is to say that it reduces the separation between additivated bitumen and aggregates compared to additives from the prior art. The laboratory test exemplified to show the performance of the additive is a separation test between additivated or non-additivated bitumen and aggregates in the presence of water, after having mixed aggregates and bitumen at a temperature of 150° C. The penetration index of the bitumen is not known. As long as the penetration index of the bitumen is between 35/50 and 160/220, the aggregates temperature of 150° C. used for the coating conforms to the standards. For a bitumen having a penetration index greater than 220, a person skilled in the art knows that this corresponds to a very high coating temperature; for a penetration index below 35, a person skilled in the art knows that this corresponds to a temperature that is too low to ensure proper coating when the bitumen is not additivated, which does not make it possible to evaluate the effect of water on the aggregate/pure bitumen separation. Thus, this test does not make it possible to measure the effect of the adhesion dope when the penetration index of the bitumen is below 35. There is no test for studying the impact of the additive on the fluidity of the asphalt mixture.

U.S. Pat. No. 6,261,356 claims the mix of bitumen, an oxypropylated and/or oxyethylated and phosphated $C_8$-$C_{22}$ fatty alcohol and at least one component chosen from mineral oils, $C_8$-$C_{18}$ fatty alcohols, $C_8$-$C_{18}$ fatty acids and $C_8$-$C_{18}$ fatty acid triglycerides. This composition has an improved adhesion to the aggregates, that is to say that it reduces the separation between additivated bitumen and aggregates compared to the additives from the prior art. The inventors believe that the last component of the mix facilitates the orientation of the phosphated product at the bitumen-aggregate interface. The laboratory test used to demonstrate the performance of the additive is a separation test between additivated bitumen and aggregates in the presence of water, after having mixed aggregates and additivated bitumen at a temperature of 150° C. for a 60/80 penetration index bitumen, that is to say a temperature that conforms to the standards. There is no test for studying the impact of the additive on the fluidity of the asphalt mixture.

U.S. Pat. No. 2,693,425 proposes the use of phosphated products in the bitumen for improving the bitumen-aggregate adhesion. The laboratory adhesion tests are carried out with a mix of aggregates and bitumen at 135° C., which is in accordance with the standards for a 70/80 penetration index bitumen. There is no test for studying the impact of the additive on the fluidity of the asphalt mixture.

Patent EP-B1-0 792 918 proposes the use of a mix of a rubber-based or resin-based modifier and an ethoxylated fatty alcohol phosphate ester in the bitumen to improve, inter alia, the bitumen-aggregate adhesion. The laboratory tests for evaluating the adhesion of the bitumen to the aggregates are carried out with a mix of aggregates and bitumen produced at 180° C., which is a temperature that conforms to standard practices. There is no test for studying the impact of the additive on the fluidity of the asphalt mixture.

Document EP 0 157 210 proposes the use of an acidic organophosphorus additive having an OH functional group in the bitumen to improve the bitumen-aggregate adhesion. The laboratory tests for evaluating the adhesion of the bitumen to the aggregates are carried out with a mix of aggregates and bitumen produced between 150° C. and 180° C. for 60/80 to 80/100 penetration index bitumens, which is a temperature range that conforms to the standards. There is no test for studying the impact of the additive on the fluidity of the asphalt mixture.

The documents of the prior art cited above use process temperatures that conform to current standards. It is known to a person skilled in the art that at these temperatures the bituminous product sees its penetration index drop as a result of it being spread in the form of thin films during the coating phase. Thus the asphalt mixture may be characterized by the penetration index of the bituminous product that it contains, once the production has been achieved and the asphalt mixture transported, laid, compacted and cooled. In order to do this, an extraction of the bituminous product present in the asphalt mixture is carried out in the 6 months that follow the realization of the site, according to the standard NF EN 12697-3 of January 2005. The penetration index of the bituminous product obtained after extraction, measured according to the standard NF EN 1426, is expressed in tenths of millimeters. This penetration index can then be compared to the initial penetration index measured on the bituminous product stored before mixing with the aggregates. Drops in the penetration indexes are observed that are generally between:

5 and 20 for a bitumen having an initial penetration index between 20 and 30;
  15 and 25 for a bitumen having an initial penetration index between 35 and 50;
  20 and 35 for a bitumen having an initial penetration index between 50 and 70;
  25 and 55 for a bitumen having an initial penetration index between 70 and 100; and
  50 and 140 for a bitumen having an initial penetration index between 160 and 220.

Solutions have been proposed in the literature for reducing the last four drawbacks cited above for the coating processes at a temperature above 100° C.

Some of these solutions relate to processes for which the production temperatures remain above 100° C., but technical solutions are found which consist in reducing the temperature for manufacturing the asphalt mixture below 100° C., as indicated hereinafter.

In U.S. Pat. No. 6,588,974, paraffin waxes are added to the bitumen so as to obtain an acceptable bitumen viscosity for coating at a lower temperature, the temperature reduction mentioned being around 30° C. The paraffin waxes used act as a plasticizer for the bitumen. At a given temperature, this helps to improve the compacting operation. At the same time, the waxes improve certain mechanical properties of the mix of aggregates and bituminous product, such as the rutting resistance. However, the addition of paraffin waxes changes the class of bitumen and may result in the standardized threshold of paraffin wax content for bitumens being exceeded. Concomitantly, there is a high risk of degrading the behaviour of the asphalt mixture when cold, by increasing its brittleness, that is to say by lowering the fracture energy upon frustrated shrinkage and by increasing the facture temperature. Furthermore, if the compacting temperature is below the temperature of crystallization of the paraffin waxes in the bitumen, the compacting is much less effective.

U.S. Pat. No. 4,371,400 describes the use of a zeolite for improving the hot flow of an asphalt mixture with a very low void content, while improving the indentation resistance at 22° C. and 40° C.

Applications US 2004/0033308 and US 2005/0076810 describe the use of zeolites, in particular zeolite A, in the production of a hot mix, which makes it possible to reduce the temperatures by at least 30° C. while maintaining normal behaviour downstream of the in-plant mixing step. However, this process is not without drawbacks: such a process requires the presence of a storage silo and a zeolite additive system. Furthermore, the use of zeolite at a dose of at least 0.2% relative to the aggregates as recommended in these two patent applications represents a not inconsiderable additional cost.

International application WO 2005/100480 describes the combined use of zeolite and waxes in the production of low-temperature poured asphalts. The process described has not only the disadvantage of the handling and cost premium due to the use of zeolite but also of waxes.

International application WO 97/20890 describes a process for manufacturing asphalt mixtures in which the mixing is carried out in two steps. Firstly, the aggregates are coated with a very soft anhydrous bitumen, the temperature of the mix obtained being between 80° C. and 115° C.; secondly, hard bitumen powder is added at a temperature below 50° C. Apart from the necessary modifications to be made to the existing industrial installations in order to be able to handle and add the bitumen powder, this process has the drawback of requiring time for a good cohesion to be obtained.

In patent EP-B1-1 263 885 aggregates at 130° C. are firstly coated with a soft anhydrous binder at 120° C. and then, in the form of foam, hard bitumen and steam are added to the mixer. The asphalt mixture obtained is then used between 70° C. and 100° C. This process also requires time for a good cohesion to be obtained. Furthermore, the residual penetration obtained after mixing the two bitumens makes this process unsuitable for temperate or hot countries.

In patent application EP-A1-1 469 038, the temperatures of the various grades injected into the mixer may be different: coarse aggregates are firstly coated with all the bitumen at a temperature above 130° C., then unheated wet sand is injected into the mixing plant, which has the advantage of limiting the energy consumption. During vaporization of the water, the fine aggregate elements are coated and the water remains within the asphalt mixture. The asphalt mixture leaves the mixing plant at a temperature of between 60° C. and 100° C. A proposed variant consists in heating the coarse aggregates to 200° C. and then coating them with all of the bitumen and injecting the unheated wet sand. In this case, the water is completely removed and the coating of the sand takes place by vaporization of the water. In the first variant, the aim is to control the coating of the sand by vaporization of its water initially in the liquid state, which has the drawback of being a phenomenon that is highly dependent on the water content. Furthermore, the fluidity of the asphalt mixture thus produced is not as good as that of a reference hot mix. In the second variant, the sand is not heated, but it is dried in the mixing plant, by heat transfer from the preheated coarse aggregates. At a given asphalt mixture temperature on leaving the plant, the amount of heat necessary to obtain an anhydrous asphalt mixture according to the patent application is therefore very close to that needed to obtain a reference asphalt mixture.

Application EP-A1-1 712 680 describes a process that consists in coating a first part of the dry and fine-containing aggregate with the binder, then in adding thereto the second part of the aggregate that has its initial moisture. The fluidity of the asphalt mixture produced is not at the level of that of the hot mix and an adjustment to the production plant is necessary.

In EP 1 323 867, the coating of cold aggregates with hot bitumen is facilitated by pretreating the aggregates with an aqueous emulsion of flux and adhesion dope, and by fluxing the bitumen. The use of flux poses the problem of the rate of increase in cohesion which is slower than that obtained by cooling in the context of a manufacture according to the reference processes.

It is thus observed that the solutions proposed above for reducing the manufacturing temperature in the hot manufacturing processes have at least one of the following drawbacks to being able to operate effectively:
the need to greatly adapt and modify the industrial production unit; and/or
the loss of certain end properties of the asphalt mixture such as robustness, fluidity, cohesion and increase of brittleness at low temperature.

SUMMARY OF THE INVENTION

The present invention provides an asphalt mixture and a process for preparing asphalt mixtures obtained from a mix of bituminous product with aggregates; these asphalt mixtures can especially be used for producing materials in the field of sealing, construction and repair of road coverings, pavements, cycle paths, parking areas, aircraft runways, etc.

The asphalt mixture comprises at least aggregate, at least one bituminous product and at least one additive B and is characterized in that:
the additive B contains at least one compound (B1) of formula $$(R-O-A-)_c-P(=O)-OH_d \qquad (B1)$$

where P is the phosphorus atom, c is between 1 and 2, c+d is equal to 3,
A represents a bond or a divalent group comprising at least one oxypropylene (OP) unit and/or at least one oxyethylene (OE) unit; and
R represents a hydrocarbon-based chain having from 1 to 30 carbon atoms, the chain possibly being linear or branched, saturated or unsaturated, the chain possibly containing at least one aromatic or non-aromatic ring; and the dose of additive(s) B1, per ton of bituminous product, being between 0.3 kg and 20 kg;
the additive B optionally, but most often, contains phosphoric acid, the dose of phosphoric acid per ton of bituminous product being less than 2 kg;
the additive B optionally, but most often, contains at least one pyrophosphate of the compound B1, in a dose per ton of bituminous product of less than 20 kg; and
the bituminous product has a difference between the penetration index before contact with the aggregates and the penetration index after extraction of the asphalt mixture of less than 5 tenths of a millimeter for a bitumen having an initial penetration index between 20 and 30 tenths of a millimeter, of less than 15 tenths of a millimeter for a bitumen having an initial penetration index between 35 and 50 tenths of a millimeter, of less than 20 tenths of a millimeter for a bitumen having an initial penetration index between 50 and 70 tenths of a millimeter, of less than 25 tenths of a millimeter for a bitumen having an initial penetration index between 70 tenths of a millimeter and 100 tenths of a millimeter, of less than 50 tenths of a millimeter for a bitumen having an initial penetration index between 160 and 220 tenths of a millimeter.

According to one preferred embodiment, A represents a divalent group comprising oxypropylene (OP) units and/or oxyethylene (OE) units, said OP/OE units generally being distributed randomly or in blocks, preferably in blocks.

According to another preferred embodiment, A represents a divalent group comprising oxypropylene (OP) units and/or oxyethylene (OE) units, said OP and/or OE units being connected to the phosphorus atom by a single bond, or by a hydrocarbon-based chain that preferably comprises one, two or three carbon atoms, as a linear or branched chain.

According to yet another preferred embodiment, the OP and/or OE units are directly bonded to the phosphorus atom (single bond), the oxygen atom of an OP or OE unit being bonded to the phosphorus atom.

Preferably, A represents the unit —$(CH_2HC(CH_3)O)_a$—$(CH_2CH_2O)_b$—, in which b is between 0 and 10 (limits included), and a is between 0 and 80, preferably between 8 and 80, more preferably between 20 and 60. In this case, the compound B1 may be written:

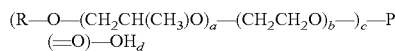

where R, a, b, c and d are as defined above.

As a variant, when the OP and/or OE groups are bonded to the phosphorus atom via a hydrocarbon-based chain, the compound B1 may advantageously correspond to the following formula:

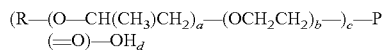

where R, a, b, c and d are as defined above.

In another preferred embodiment, a represents 0 when R contains at least 10 carbon atoms, and a is between 8 and 80, preferably between 20 and 60, when R contains less than 10 carbon atoms.

According to another embodiment, A in the compound of formula B1 represents a single bond. The compound B1 may then be written:

$$(R-O-)_c-P(=O)-OH_d$$

where R, c and d are as defined above.

The compounds of formula B1 are either commercially available, or prepared according to known procedures, or else by adapting known procedures, said procedures being available in the literature and scientific articles, patent literature, Chemical Abstracts, computer databases, or else from the Internet.

By way of example, and non-limitingly, a process for preparing a compound B1 as defined previously consists of the polymerization by addition of propylene oxide and/or ethylene oxide to an alcohol of formula R—OH, where R is as defined previously, followed by the reaction with $P_2O_5$. The structure of the polypropylene glycol and polyethylene glycol sections may be random or in blocks, and in the latter case the order of blocks is not limited.

Some of the compounds of formula B1 are known and available commercially under the mark Beycostat™ (sold by CECA S.A.).

The present invention also relates to the compounds of formula B1 described above prepared from raw materials of renewable origin, that is to say from raw materials of non-fossil origin.

More specifically, the expression "raw materials of renewable origin" is understood to mean the raw materials that comprise at least one carbon atom, preferably several, more preferably all, of the carbon atoms of renewable origin.

Unlike materials derived from fossil materials, the materials composed of raw materials of renewable origin contain carbon isotope 14 ($^{14}C$). All samples of carbon taken from living organisms (animals or plants) are in fact a mixture of 3 isotopes: $^{12}C$ (representing around 98.892%), $^{13}C$ (around 1.108%) and $^{14}C$ (traces: around $1.2\times10^{-12}$%). The $^{14}C/^{12}C$ ratio of living tissues is identical to that of the atmosphere. In the environment, $^{14}C$ exists in two predominant forms: in mineral form, that is to say in the form of carbon dioxide ($CO_2$) and in organic form, that is to say in the form of carbon incorporated in organic molecules.

In a living organism, the $^{14}C/^{12}C$ ratio is kept constant by the metabolism since the carbon is continually exchanged with the environment. Since the proportion of $^{14}C$ is constant in the atmosphere, it is the same in the organism, as long as it is living, since it absorbs $^{14}C$ as it absorbs $^{12}C$. The proportion of $^{14}C$ and of $^{12}C$ has not changed significantly over the last few thousands of years and the average $^{14}C/^{12}C$ ratio is equal to around $1.2\times10^{-12}$.

$^{12}C$ is stable, that is to say that the number of $^{12}C$ atoms in a given sample is constant over time. $^{14}C$, itself, is radioactive (each gram of carbon from a living being contains enough $^{14}C$ isotope to give 13.6 disintegrations per minute) and the number of such atoms in a sample decreases over time (t) according to the law:

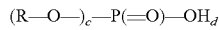

in which
no is the number of $^{14}C$ at the start (at the death of the creature, animal or plant);
n is the number of $^{14}C$ atoms remaining at the end of time t; and
a is the disintegration constant (or radioactive constant); it is linked to the half-life.

The half-life (or period) is the duration at the end of which any number of radioactive nuclei or of unstable particles of a given species is reduced by half by disintegration; the half-time $T_{1/2}$ is connected to the disintegration constant a by the formula $aT_{1/2}=\ln 2$. The half-life of $^{14}C$ is equal to around 5730 years.

Considering the half-life ($T_{1/2}$) of $^{14}C$, the $^{14}C$ content is considered to be constant from the extraction of the raw materials of renewable origin up to the synthesis of the compound of formula B1, and even up to the end of its use.

In the context of the present invention, the compounds of formula B1 may easily be obtained from raw materials of renewable origin. More precisely, the group A may, for example, be prepared from ethylene and/or propylene epoxide originating from ethylene and/or propylene of plant or animal origin (by fermentation, dehydration of plant alcohols, etc.). The R group may originate from alcohols derived from the plant or animal domain by fermentation, reduction of fatty acids present in the plants or the plant fats, etc.

Thus, the compounds of formula B1 according to the present invention, when they are prepared completely or partly from raw materials of renewable origin, are characterized by the fact that they contain an amount of the carbon isotope 14 greater than that of the same compounds of formula B1 prepared exclusively from raw materials of fossil origin.

Currently, at least two different techniques exist for measuring the $^{14}C$ content of a sample:
by liquid scintillation spectrometry: this method consists in counting "beta" (β) particles resulting from the disintegration of $^{14}C$. The "beta" radiation resulting from a sample of known mass (known number of $^{12}C$ atoms) is measured over a certain time. This "radioactivity" is proportional to the number of $^{14}C$ atoms, that it is thus possible to determine. The $^{14}C$ present in the sample emits β radiation which, in contact with a scintillation liquid (scintillator), gives rise to photons. These photons have different energies (between 0 keV and 156 keV) and form what is known as a $^{14}C$ spectrum. According to two variants of this method, the analysis focuses either on the carbon dioxide previously produced by the carbon-based sample in a suitable absorbent solution, or on benzene after prior conversion of the carbon-based sample to benzene; and by mass spectrometry: the sample is reduced to graphite or to gaseous carbon dioxide, then analyzed in a mass spectrometer. This technique uses an accelerator and a mass spectrometer to separate the $^{14}C$ ions from the $^{12}C$ ions and therefore to determine the ratio of the two isotopes.

All these methods for measuring the $^{14}C$ content of compounds are described precisely in the ASTM D 6866 standard (especially in ASTM D 6866-06 of January 2006) and in the ASTM D 7026 standard (especially in ASTM D 7026-04). The measurement method preferably used in the case of the compounds of formula B1 of the invention is the mass spectrometry described in the ASTM D 6866-06 standard ("Radiocarbon and Isotope Ratio Mass Spectroscopy Analysis").

The compounds of formula B1 prepared from at least one raw material of renewable origin are novel and in this way are also part of the present invention. These compounds are characterized by a non-zero $^{14}C$ content, more precisely a $^{14}C/^{12}C$ ratio that is strictly greater than 0 and less than or equal to around $1.2 \times 10^{-12}$, the value 0 indicating a compound B1 obtained exclusively from carbon of non-renewable origin, the value $1.2 \times 10^{-12}$ indicating a compound B1 prepared exclusively from carbon of renewable origin.

The present invention also relates to the process for preparing an asphalt mixture of the present invention which comprises the physical mixing of aggregates with at least one bituminous product and at least one additive B as defined previously.

According to one variant of the process of the invention, one possibility consists in mixing the bituminous product comprising at least one additive B with the aggregates. According to another variant, it is possible to mix the bituminous product with the aggregates, then to mix at least one additive B with the premix (aggregate/bituminous product). According to a third variant, it is possible to mix, preferably to spray, at least one additive B onto the aggregates, then to mix them with at least one bituminous product.

In each of the variants, the mixing of the various ingredients with one another may be carried out according to any process known to a person skilled in the art, for example mixing, compounding, spraying, etc.

The preparation process according to the invention is especially characterized by the fact that the asphalt mixtures containing at least one additive B may be obtained at temperatures below those needed for the preparation of conventional asphalt mixtures, and in particular:

the mixing of aggregates and bituminous product is carried out at temperatures of the granular fractions, which may be different or identical, but which make it possible to produce an asphalt mixture at a temperature between 60° C. and 200° C., and preferably between 100° C. and 200° C. Compared to the prior art, on leaving the production plant, the temperature of the aggregates/bituminous product mixes may be lowered (reduced), surprisingly, by an amplitude ranging up to 50° C., preferably from 20° C. to 50° C.;

the temperature of the mix of aggregates and bituminous product during spreading is lowered, surprisingly, by an amplitude of 5° C. to 50° C.; and the temperature of the mix of aggregates and bituminous product within the road covering at the start of compacting, when it takes place, is lowered, surprisingly, by an amplitude of 10° C. to 50° C. without degrading the standardized properties of the bituminous product and of the mix of bituminous product and aggregates, while maintaining management of the process, from transportation to optional compacting, in accordance with the prior art, apart from the abovementioned considerations with regard to the temperatures; in the USA, for hot mix asphalts, the reference standard is the AASHTO PP28 standard. It indicates, as a function of the viscosity of the bituminous product, the temperature range of the mix of aggregate and bituminous product; the AASHTO PP28 standard indicates, as a function of the viscosity of the bituminous product, the temperature range of the mixes of aggregate and bituminous product for compacting; in France, the French standard NF P 98-150 from December 1992 constitutes the reference standard for implementing roadway structures, binder courses and wearing courses made of hydrocarbon-based asphalt mixtures, the French standard NF P 98-130 from November 1999 constitutes the reference standard for semi-coarse bituminous concretes and the French standard NF P 98-138 from November 1999 constitutes the reference standard for bitumen-bound gravels; by way of example, for a 35/50 penetration index bitumen, these standards indicate that the acceptable limit temperatures are from 150° C. to 170° C. for the coating operation and that, for spreading, the minimum temperature of the asphalt mixture is 130° C.

As previously indicated, the additive or additives B may be added to the bituminous product upstream of the zone for mixing the aggregates and bituminous product, or sprayed over the heated aggregates, before and/or during the addition of the bituminous product. This spraying is carried out so as to ensure a good distribution of the additive or additives over the aggregates.

During the bituminous product-aggregates mixing, the temperature of the bituminous product is between 100° C. and 250° C. These temperatures depend, on the one hand, on the class of penetration index of the bituminous product: the lower this penetration index is, the hotter the bituminous product and aggregates should be. These temperatures depend, on the other hand, on the ring-and-ball softening temperature of the bituminous product: the higher this temperature is, the hotter the bituminous product and aggregates should be. The bituminous product used in the process that is the subject of the present invention is used at a temperature in accordance with the prior art.

Within the context of the present invention, the additives B cited above may be used pure or diluted using carbon-based solvents such as petroleum solvents and/or vegetable oils when they are mixed with the bituminous products.

Within the context of the present invention, the bituminous product may, other than the bitumen, contain one or more polymers or copolymers such as, for example, poly(styrene-butadiene), poly(styrene-isoprene), polybutadiene, polychloroprene, polyisoprene, poly(ethylene-vinyl acetate), poly(olefin-alkyl acrylate) such as, for example, poly(ethylene-alkyl acrylate), poly(olefin-alkyl methacrylate) such as, for example, poly(ethylene-alkyl methacrylate), poly(ethylene-acrylic acid), polyolefins, polyesters, reground rubber, and also one or more crosslinking agents that make it possible to increase the storage stability of the mix of bitumen and polymer such as, for example, sulphur.

The polymer or polymers, when they are present, are generally added in an amount of 1% to 10% by weight relative to the weight of bitumen.

Preferably, the process for preparing asphalt mixtures according to the invention is carried out according to the operating conditions detailed below, it being understood that the temperature ranges extend in the broad sense (limits included):

for a pure bitumen (i.e. without addition of polymer(s)) having a penetration index between 10 and 20:
- the temperature of the aggregates during mixing with the bitumen is above 130° C., preferably between 130 and 150° C.,
- the temperature of the mix of aggregates and bituminous product during spreading is between 120 and 150° C.,
- the temperature of the mix of aggregates and bituminous product within the road covering at the start of compacting, when it takes place, is between 120 and 150° C.;

for a pure bitumen having a penetration index between 20 and 35:
- the temperature of the aggregates during mixing with the bitumen is above 120° C., preferably between 120 and 150° C.,
- the temperature of the mix of aggregates and bituminous product during spreading is between 110 and 135° C.,
- the temperature of the mix of aggregates and bituminous product within the road covering at the start of compacting, when it takes place, is between 110° C. and 135° C.;

for a pure bitumen having a penetration index between 35 and 50:
- the temperature of the aggregates during mixing with the bitumen is above 110° C., preferably between 110° C. and 140° C.,
- the temperature of the mix of aggregates and bituminous product during spreading is between 95° C. and 125° C.,
- the temperature of the mix of aggregates and bituminous product within the road covering at the start of compacting, when it takes place, is between 95° C. and 125° C.;

for a pure bitumen having a penetration index between 50 and 70:
- the temperature of the aggregates during mixing with the bitumen is above 105° C., preferably between 105° C. and 135° C.,
- the temperature of the mix of aggregates and bituminous product during spreading is between 90° C. and 120° C.,
- the temperature of the mix of aggregates and bituminous product within the road covering at the start of compacting, when it takes place, is between 85° C. and 120° C.:

for a pure bitumen having a penetration index between 70 and 100:
- the temperature of the aggregates during mixing with the bitumen is above 100° C., preferably between 100° C. and 125° C.,
- the temperature of the mix of aggregates and bituminous product during spreading is between 85° C. and 115° C.,
- the temperature of the mix of aggregates and bituminous product within the road covering at the start of compacting, when it takes place, is between 85° C. and 115° C.;

for a pure bitumen having a penetration index between 100 and 160:
- the temperature of the aggregates during mixing with the bitumen is above 100° C., preferably between 100° C. and 125° C.,
- the temperature of the mix of aggregates and bituminous product during spreading is between 80° C. and 105° C.,
- the temperature of the mix of aggregates and bituminous product within the road covering at the start of compacting, when it takes place, is between 80° C. and 105° C.;

for a pure bitumen having a penetration index between 160 and 250:
- the temperature of the aggregates during mixing with the bitumen is above 100° C., preferably between 100° C. and 120° C.,
- the temperature of the mix of aggregates and bituminous product during spreading is between 75° C. and 100° C.,
- the temperature of the mix of aggregates and bituminous product within the road covering at the start of compacting, when it takes place, is between 75° C. and 100° C.;

for a bitumen having a penetration index between 10 and 20 before addition of polymer(s) and containing between 1 and 4% of polymer(s):
- the temperature of the aggregates during mixing with the bitumen is above 150° C., preferably between 150° C. and 180° C.,
- the temperature of the mix of aggregates and bituminous product during spreading is between 145° C. and 175° C.,
- the temperature of the mix of aggregates and bituminous product within the road covering at the start of compacting, when it takes place, is between 145° C. and 175° C.;

for a bitumen having a penetration index between 20 and 35 before addition of polymer(s) and containing between 1 and 4% of polymer(s):
- the temperature of the aggregates during mixing with the bitumen is above 140° C., preferably between 140° C. and 165° C.,
- the temperature of the mix of aggregates and bituminous product during spreading is between 130° C. and 160° C.,
- the temperature of the mix of aggregates and bituminous product within the road covering at the start of compacting, when it takes place, is between 130° C. and 160° C.;

for a bitumen having a penetration index between 35 and 50 before addition of polymer(s) and containing between 1 and 4% of polymer(s):
- the temperature of the aggregates during mixing with the bitumen is above 130° C., preferably between 130° C. and 155° C.,
- the temperature of the mix of aggregates and bituminous product during spreading is between 120° C. and 150° C.,
- the temperature of the mix of aggregates and bituminous product within the road covering at the start of compacting, when it takes place, is between 120° C. and 150° C.;

for a bitumen having a penetration index between 50 and 70 before addition of polymer(s) and containing between 1 and 4% of polymer(s):
  the temperature of the aggregates during mixing with the bitumen is above 120° C., preferably between 120° C. and 150° C.,
  the temperature of the mix of aggregates and bituminous product during spreading is between 115° C. and 140° C.,
  the temperature of the mix of aggregates and bituminous product within the road covering at the start of compacting, when it takes place, is between 115° C. and 140° C.;
for a bitumen having a penetration index between 70 and 100 before addition of polymer(S) and containing between 1 and 4% of polymer(s):
  the temperature of the aggregates during mixing with the bitumen is above 120° C., preferably between 120° C. and 140° C.,
  the temperature of the mix of aggregates and bituminous product during spreading is between 110° C. and 135° C.,
  the temperature of the mix of aggregates and bituminous product within the road covering at the start of compacting, when it takes place, is between 110° C. and 135° C.;
for a bitumen having a penetration index between 100 and 160 before addition of polymer and containing between 1 and 4% of polymer(s):
  the temperature of the aggregates during mixing with the bitumen is above 120° C., preferably between 120° C. and 140° C.,
  the temperature of the mix of aggregates and bituminous product during spreading is between 105° C. and 130° C.,
  the temperature of the mix of aggregates and bituminous product within the road covering at the start of compacting, when it takes place, is between 105° C. and 130° C.;
for a pure bitumen having a penetration index between 160 and 250 before addition of polymer(s) and containing between 1 and 4% of polymer(s):
  the temperature of the aggregates during mixing with the bitumen is above 120° C., preferably between 120° C. and 140° C.,
  the temperature of the mix of aggregates and bituminous product during spreading is between 100° C. and 125° C.,
  the temperature of the mix of aggregates and bituminous product within the road covering at the start of compacting, when it takes place, is between 100° C. and 125° C.;
for a bitumen having a penetration index between 10 and 20 before addition of polymer(s) and containing between 4 and 8% of polymer(s):
  the temperature of the aggregates during mixing with the bitumen is above 155° C., preferably between 155° C. and 185° C.,
  the temperature of the mix of aggregates and bituminous product during spreading is between 150° C. and 180° C.,
  the temperature of the mix of aggregates and bituminous product within the road covering at the start of compacting, when it takes place, is between 150° C. and 180° C.;
for a bitumen having a penetration index between 20 and 35 before addition of polymer(s) and containing between 4 and 8% of polymer(s):
  the temperature of the aggregates during mixing with the bitumen is above 145° C., preferably between 145° C. and 170° C.,
  the temperature of the mix of aggregates and bituminous product during spreading is between 135° C. and 165° C.,
  the temperature of the mix of aggregates and bituminous product within the road covering at the start of compacting, when it takes place, is between 135° C. and 165° C.;
for a bitumen having a penetration index between 35 and 50 before addition of polymer(s) and containing between 4 and 8% of polymer(s):
  the temperature of the aggregates during mixing with the bitumen is above 135° C., preferably between 135° C. and 160° C.,
  the temperature of the mix of aggregates and bituminous product during spreading is between 125° C. and 155° C.,
  the temperature of the mix of aggregates and bituminous product within the road covering at the start of compacting, when it takes place, is between 125° C. and 155° C.;
for a bitumen having a penetration index between 50 and 70 before addition of polymer(s) and containing between 4 and 8% of polymer(s):
  the temperature of the aggregates during mixing with the bitumen is above 130° C., preferably between 130° C. and 155° C.,
  the temperature of the mix of aggregates and bituminous product during spreading is between 120° C. and 145° C.,
  the temperature of the mix of aggregates and bituminous product within the road covering at the start of compacting, when it takes place, is between 120° C. and 145° C.;
for a bitumen having a penetration index between 70 and 100 before addition of polymer(s) and containing between 4 and 8% of polymer(s):
  the temperature of the aggregates during mixing with the bitumen is above 125° C., preferably between 125° C. and 145° C.,
  the temperature of the mix of aggregates and bituminous product during spreading is between 120° C. and 140° C.,
  the temperature of the mix of aggregates and bituminous product within the road covering at the start of compacting, when it takes place, is between 115° C. and 140° C.;
for a bitumen having a penetration index between 100 and 160 before addition of polymer(s) and containing between 4 and 8% of polymer(s):
  the temperature of the aggregates during mixing with the bitumen is above 125° C., preferably between 125° C. and 145° C.,
  the temperature of the mix of aggregates and bituminous product during spreading is between 115° C. and 135° C.,
  the temperature of the mix of aggregates and bituminous product within the road covering at the start of compacting, when it takes place, is between 110° C. and 135° C.;

for a pure bitumen having a penetration index between 160 and 250 before addition of polymer(s) and containing between 4 and 8% of polymer(s):

the temperature of the aggregates during mixing with the bitumen is above 125° C., preferably between 125° C. and 145° C., the temperature of the mix of aggregates and bituminous product during spreading is between 110° C. and 130° C., the temperature of the mix of aggregates and bituminous product within the road covering at the start of compacting, when it takes place, is between 105° C. and 130° C.

The temperature ranges indicated above overlap when the bitumen penetration index is changed: generally, a person skilled in the art chooses the temperatures on the basis of the class of bitumen used and not on the exact penetration index of the bitumen used. However, a person skilled in the art may be led to wonder what temperature to choose for the production, spreading or compacting during the use of a bitumen whose penetration index is exactly on the border between two classes. The invention then makes it possible to choose the lowest temperature range. For example, for a pure bitumen having a penetration index of 35, the two temperature ranges are the following: 120-150° C. and 110-140° C. during production at the plant outlet. The invention makes it possible to choose the lowest temperature range 110-140° C. The more specific choice of temperature inside this range depends on the performance of the plant, on the temperature and nature and dose of the bitumen used, on the nature and grade of the aggregates, on the weather conditions during transport and on-site, on the transport time, on the performance of the spreading and compacting equipment, and on the targeted level for the properties of the asphalt mixture. The properties of the asphalt mixture are then in accordance with the standards, while maintaining management of the process, from transportation to the optional compacting in accordance with the prior art, apart from the abovementioned considerations with regard to the temperatures. Working in the temperature range above 120-150° C. will facilitate the operations while remaining within the scope of the invention.

More preferably still, the operating conditions of the process according to the invention are the following:

for a pure bitumen having a penetration index between 10 and 20:

the temperature of the aggregates during mixing with the bitumen is between 135° C. and 150° C., the temperature of the mix of aggregates and bituminous product during spreading is between 125° C. and 145° C., the temperature of the mix of aggregates and bituminous product within the road covering at the start of compacting, when it takes place, is between 125° C. and 145° C.;

for a pure bitumen having a penetration index between 20 and 35:

the temperature of the aggregates during mixing with the bitumen is between 125° C. and 135° C., the temperature of the mix of aggregates and bituminous product during spreading is between 115° C. and 125° C., the temperature of the mix of aggregates and bituminous product within the road covering at the start of compacting, when it takes place, is between 105° C. and 125° C.;

for a pure bitumen having a penetration index between 35 and 50:

the temperature of the aggregates during mixing with the bitumen is between 115° C. and 125° C., the temperature of the mix of aggregates and bituminous product during spreading is between 105° C. and 115° C., the temperature of the mix of aggregates and bituminous product within the road covering at the start of compacting, when it takes place, is between 95° C. and 105° C.;

for a pure bitumen having a penetration index between 50 and 70:

the temperature of the aggregates during mixing with the bitumen is between 105° C. and 115° C., the temperature of the mix of aggregates and bituminous product during spreading is between 95° C. and 105° C., the temperature of the mix of aggregates and bituminous product within the road covering at the start of compacting, when it takes place, is between 85° C. and 95° C.;

for a pure bitumen having a penetration index between 70 and 100:

the temperature of the aggregates during mixing with the bitumen is between 100° C. and 105° C., the temperature of the mix of aggregates and bituminous product during spreading is between 85° C. and 95° C., the temperature of the mix of aggregates and bituminous product within the road covering at the start of compacting, when it takes place, is between 85° C. and 95° C.;

for a pure bitumen having a penetration index between 100 and 160:

the temperature of the aggregates during mixing with the bitumen is between 100° C. and 105° C., the temperature of the mix of aggregates and bituminous product during spreading is between 85° C. and 95° C., the temperature of the mix of aggregates and bituminous product within the road covering at the start of compacting, when it takes place, is between 85° C. and 95° C.;

for a pure bitumen having a penetration index between 160 and 250:

the temperature of the aggregates during mixing with the bitumen is between 100° C. and 105° C., the temperature of the mix of aggregates and bituminous product during spreading is between 80° C. and 85° C., the temperature of the mix of aggregates and bituminous product within the road covering at the start of compacting, when it takes place, is between 80° C. and 85° C.;

for a bitumen having a penetration index between 10 and 20 before addition of polymer(s) and containing between 1 and 4% of polymer(s):

the temperature of the aggregates during mixing with the bitumen is between 150° C. and 180° C., the temperature of the mix of aggregates and bituminous product during spreading is between 145° C. and 175° C., the temperature of the mix of aggregates and bituminous product within the road covering at the start of compacting, when it takes place, is between 145° C. and 175° C.;

for a bitumen having a penetration index between 20 and 35 before addition of polymer(s) and containing between 1 and 4% of polymer(s):
   the temperature of the aggregates during mixing with the bitumen is between 140° C. and 150° C.,
   the temperature of the mix of aggregates and bituminous product during spreading is between 130° C. and 145° C.,
   the temperature of the mix of aggregates and bituminous product within the road covering at the start of compacting, when it takes place, is between 130° C. and 145° C.;

for a bitumen having a penetration index between 35 and 50 before addition of polymer(s) and containing between 1 and 4% of polymer(s):
   the temperature of the aggregates during mixing with the bitumen is between 130° C. and 140° C.,
   the temperature of the mix of aggregates and bituminous product during spreading is between 120° C. and 130° C.,
   the temperature of the mix of aggregates and bituminous product within the road covering at the start of compacting, when it takes place, is between 120° C. and 130° C.;

for a bitumen having a penetration index between 50 and 70 before addition of polymer(s) and containing between 1 and 4% of polymer(s):
   the temperature of the aggregates during mixing with the bitumen is between 120° C. and 130° C.,
   the temperature of the mix of aggregates and bituminous product during spreading is between 115° C. and 120° C.,
   the temperature of the mix of aggregates and bituminous product within the road covering at the start of compacting, when it takes place, is between 110° C. and 120° C.;

for a bitumen having a penetration index between 70 and 100 before addition of polymer(s) and containing between 1 and 4% of polymer(s):
   the temperature of the aggregates during mixing with the bitumen is between 120° C. and 130° C.,
   the temperature of the mix of aggregates and bituminous product during spreading is between 115° C. and 120° C.,
   the temperature of the mix of aggregates and bituminous product within the road covering at the start of compacting, when it takes place, is between 110° C. and 120° C.;

for a bitumen having a penetration index between 100 and 160 before addition of polymer(s) and containing between 1 and 4% of polymer(s):
   the temperature of the aggregates during mixing with the bitumen is between 120° C. and 130° C.,
   the temperature of the mix of aggregates and bituminous product during spreading is between 105° C. and 115° C.,
   the temperature of the mix of aggregates and bituminous product within the road covering at the start of compacting, when it takes place, is between 105° C. and 110° C.;

for a pure bitumen having a penetration index between 160 and 250 before addition of polymer(s) and containing between 1 and 4% of polymer(s):
   the temperature of the aggregates during mixing with the bitumen is between 120° C. and 130° C.,
   the temperature of the mix of aggregates and bituminous product during spreading is between 105° C. and 115° C.,
   the temperature of the mix of aggregates and bituminous product within the road covering at the start of compacting, when it takes place, is between 100° C. and 105° C.;

for a bitumen having a penetration index between 10 and 20 before addition of polymer(s) and containing between 4 and 8% of polymer(s):
   the temperature of the aggregates during mixing with the bitumen is between 165° C. and 185° C.,
   the temperature of the mix of aggregates and bituminous product during spreading is between 155° C. and 180° C.,
   the temperature of the mix of aggregates and bituminous product within the road covering at the start of compacting, when it takes place, is between 155° C. and 180° C.;

for a bitumen having a penetration index between 20 and 35 before addition of polymer(s) and containing between 4 and 8% of polymer(s):
   the temperature of the aggregates during mixing with the bitumen is between 155° C. and 165° C.,
   the temperature of the mix of aggregates and bituminous product during spreading is between 145° C. and 155° C.,
   the temperature of the mix of aggregates and bituminous product within the road covering at the start of compacting, when it takes place, is between 145° C. and 155° C.;

for a bitumen having a penetration index between 35 and 50 before addition of polymer(s) and containing between 4 and 8% of polymer(s):
   the temperature of the aggregates during mixing with the bitumen is between 145° C. and 155° C.,
   the temperature of the mix of aggregates and bituminous product during spreading is between 135° C. and 145° C.,
   the temperature of the mix of aggregates and bituminous product within the road covering at the start of compacting, when it takes place, is between 130° C. and 145° C.;

for a bitumen having a penetration index between 50 and 70 before addition of polymer(s) and containing between 4 and 8% of polymer(s):
   the temperature of the aggregates during mixing with the bitumen is between 135° C. and 145° C.,
   the temperature of the mix of aggregates and bituminous product during spreading is between 125° C. and 135° C.,
   the temperature of the mix of aggregates and bituminous product within the road covering at the start of compacting, when it takes place, is between 125° C. and 130° C.;

for a bitumen having a penetration index between 70 and 100 before addition of polymer(s) and containing between 4 and 8% of polymer(s):
   the temperature of the aggregates during mixing with the bitumen is between 125° C. and 135° C.,
   the temperature of the mix of aggregates and bituminous product during spreading is between 120° C. and 125° C.,
   the temperature of the mix of aggregates and bituminous product within the road covering at the start of compacting, when it takes place, is between 120° C. and 125° C.;

for a bitumen having a penetration index between 100 and 160 before addition of polymer(s) and containing between 4 and 8% of polymer(s):
  the temperature of the aggregates during mixing with the bitumen is between 125° C. and 135° C.,
  the temperature of the mix of aggregates and bituminous product during spreading is between 115° C. and 120° C.,
  the temperature of the mix of aggregates and bituminous product within the road covering at the start of compacting, when it takes place, is between 115° C. and 120° C.;
for a pure bitumen having a penetration index between 160 and 250 before addition of polymer(s) and containing between 4 and 8% of polymer(s):
  the temperature of the aggregates during mixing with the bitumen is between 125° C. and 135° C.,
  the temperature of the mix of aggregates and bituminous product during spreading is between 110° C. and 115° C.,
  the temperature of the mix of aggregates and bituminous product within the road covering at the start of compacting, when it takes place, is between 110° C. and 115° C.

The advantages of the invention over the prior art are listed below and in particular include the alleviation of the four abovementioned drawbacks when carrying out asphalt mixture manufacturing processes at temperatures above 100° C.:
  fossil fuel consumption is reduced when the temperature for producing the mix of aggregates and bituminous product is reduced by heating the aggregates at a lower temperature;
  dust and GHG emission is reduced;
  the difficult working conditions during the spreading and compacting operations are reduced;
  the operations of spreading and compacting the asphalt mixture are safeguarded with respect to the weather conditions, this safeguarding in particular being possible for mixes of aggregates and bituminous products for which the temperature on leaving the production plant is in accordance with the standards and for which the spreading and compacting temperatures are lowered compared to the standards;
  the period of time that the asphalt mixture can be used for after it has been produced is extended;
  when two lanes of asphalt mixture are deposited in succession side by side, the join separating them is stronger and better sealed;
  thermal shrinkage is more limited, as is the risk of cracking;
  there is less oxidation of the bituminous product, which leads to a smaller difference in penetration index between the penetration index measured on the initial bitumen and the penetration index measured on the bitumen extracted from the asphalt mixture, compared to the difference in penetration index measured on a hot mix;
  the smaller difference in penetration index increases the lifetime of the bituminous product/aggregates mix;
  the reduced oxidation of the bituminous product explained previously has another advantage of facilitating the recycling of said bituminous product;
  the asphalt mixture production temperatures are lowered by heating the granulates at a lower temperature without investment in the production unit being needed;
  the time between the start of spreading of the asphalt mixture and reopening to traffic is reduced; and
  there is no impact on the final mechanical properties of the bituminous construction material in the sense that these properties remain in accordance with the current standards.

The invention also relates to the use of the additives described previously, of formula B or of formula B1, which are possibly obtained, partially or completely, from raw materials of renewable origin, in the process for preparing asphalt mixtures as described above. The use of such additives permits the preparation of asphalt mixtures at temperatures substantially lower than those commonly used in this field.

The present invention also relates to the use of asphalt mixtures prepared according to the process defined above, for producing materials in the field of sealing, construction and repair of road coverings, pavements, cycle paths, playgrounds, parking areas and aircraft runways.

Finally another subject of the invention is surfaces, road coverings, pavements, cycle paths, playgrounds, parking areas and aircraft runways completely or partly covered with at least one asphalt mixture as defined in the present description.

The invention is now illustrated using the following exemplary embodiments, which do not have an objective of limiting the scope thereof defined by the claims appended to the present description.

EXAMPLES

In Example 1, the additives were added to the 35/50 penetration index bitumen at 160° C., on a hot plate with stirring at 60 rpm for 15 minutes.

The penetration (or penetrability) and ring-and-ball softening point measurements on the asphalt mixtures were in accordance with the NF EN 1426 and NF EN 1427 standards, respectively.

Example 1

The following additives were added to a 35/50 penetration index bitumen from Total called AZALT, obtained from the Feyzin refinery (Rhône, France):
  Additive 1: mixture of 93% by weight of product $B1_A$ of chemical formula $(R\text{—}O\text{—}(CH_2CH(CH_3)O)_a\text{—}(CH_2CH_2O)_b)_c\text{—}P(=O)\text{—}OH_d$ with P being the phosphorus atom, c being between 1 and 2, c+d being equal to 3, a being equal to 0, b being equal to 4 and R representing a linear hydrocarbon-based chain having between 12 and 14 carbon atoms, 3% by weight of alcohol ROH, 2% by weight of phosphoric acid, 2% by weight of pyrophosphoric derivatives of the product $B1_A$ above, sold under the name Beycostat™ A244;
  Additive 2: mixture of 94% by weight of product $B1_B$ of chemical formula $(R\text{—}O\text{—}(CH_2CH(CH_3)O)_a\text{—}(CH_2CH_2O)_b)_c\text{—}P(=O)\text{—}OH_d$ with P being the phosphorus atom, c being between 1 and 2, c+d being equal to 3, a being equal to 0, b being equal to 4 and R representing a linear hydrocarbon-based chain having between 16 and 18 carbon atoms, 3% by weight of alcohol ROH, 2% by weight of phosphoric acid, 1% by weight of pyrophosphoric derivatives of the product $B1_B$ above, sold under the name Beycostat® A684;
  Additive 3: mixture of 97% by weight of product $B1_C$ of chemical formula $(R\text{—}O\text{—}(CH_2CH(CH_3)O)_a\text{—}(CH_2CH_2O)_b)_c\text{—}P(=O)\text{—}OH_d$ with P being the phosphorus atom, c being between 1 and 2, c+d being equal to 3, a being equal to 4, b being equal to 2 and R representing the nonylphenol hydrocarbon-based chain, the weight proportions of the product of phosphate monoester and phosphate diester being respectively between 50 to 65% and 30 to 40%, and 3% by weight of phosphoric acid;

Additive 4: mixture of 98% by weight of product $B1_D$ of chemical formula $(R-O-(CH_2CH(CH_3)O)_a-(CH_2CH_2O)_b)_c-P(=O)-OH_d$ with P being the phosphorus atom, c being between 1 and 2, c+d being equal to 3, a being equal to 0, b being equal to 0 and R representing the nonylphenol hydrocarbon-based chain, the weight proportions of the product of phosphate monoester and phosphate diester being respectively between 50 to 65% and 30 to 40%, and 3% by weight of phosphoric acid.

The penetrability and ring-and-ball softening point measurements are given in the following table:

| No. | Nature of the specimen | Penetration (×0.1 mm) at 25° C. | Penetration limits (×0.1 mm) | Softening point (° C.) | Softening point limits (° C.) |
|---|---|---|---|---|---|
| 1 | Pure bitumen | 37 | 35-50 | 55 | 50-58 |
| 2 | Bitumen + Additive 1 (5 kg/t) | 37 | | 54 | |
| 3 | Bitumen + Additive 2 (5 kg/t) | 36 | | 55 | |
| 4 | Bitumen + Additive 3 (5 kg/t) | 39 | | 53 | |
| 5 | Bitumen + Additive 4 (5 kg/t) | 41 | | 55 | |

The class of the bitumen was not modified by adding the additives.

Example 2

The additive 2 (according to Example 1) was added to a 60/70 penetration index bitumen sold by Repsol. The penetration index of this bitumen was measured before and after its use in the manufacture of a BBSG (a semi-coarse bituminous concrete) asphalt mixture. The extraction of the bitumen was carried out according to the NF EN 12697-3 standard. The bitumens originating from a hot mix manufactured according to the NF P 98-130 standard and from a warm mix were compared. The manufactures of the asphalt mixtures were carried out under the conditions described in the table below:

| No. | Nature of the specimen | Aggregate temperature at production (° C.) | Temperature at compacting (° C.) | Penetration (×0.1 mm) at 25° C. | Penetration after extraction (×0.1 mm) at 25° C. | Difference in penetration (×0.1 mm) at 25° C. |
|---|---|---|---|---|---|---|
| 1 | 60/70 bitumen | 150 | 140 | 61 | 40 | 21 |
| 2 | 60/70 bitumen + additive 2 | 120 | 110 | 61 | 50 | 11 |

The reduction in the difference in penetration of the bitumens originating from asphalt mixtures No. 1 and No. 2 can be observed. Specifically the penetration has changed from 61 to 50, i.e. a difference of 11 for the warm mix, owing to the use of the additive 2, whereas the penetration has changed from 61 to 40, i.e. a difference of 21, for the hot mix.

Example 3

In a fixed batch plant, a 0/10 BBSG (a semi-coarse bituminous concrete) of Class 3 was manufactured in four different grades, all four having the following granular formula:

| calcareous filler | limestone | 3% |
|---|---|---|
| 0/4 sand | granite | 44% |
| 4/6 aggregates | granite | 12% |
| 6/10 aggregates | granite | 41% |

The bitumen used was the same as that from Example 1 (35/50 penetration index AZALT from Total). The content of bituminous product was 5.7 g per 100 g of aggregates. For the first two grades, the bitumen was used pure. For the other four grades, the following additives were added to the bitumen with a dose of 4 kg per ton of bitumen.

The additives 1 to 4 tested were the same as those described in Example 1.

Each additive was introduced via the hatch of the dedicated bitumen storage tank. The bitumen to which the additives 1 and 2 had thus been added was used after 30 minutes of recirculation in the storage tank. The bitumen to which the additives 3 and 4 had been added was used after 2 h 30 minutes of recirculation in the storage tank.

During the production of the asphalt mixture, the following temperatures were respected:
the aggregate was heated to 160° C. in the case of the first grade and 120° C. in the case of the other five grades; and
the bitumen was in all cases used at 160° C.

The spreading was carried out using a Vogele 1900 finisher, the speed of advance of which was 5 m/min, and a Dynapac CC422 compacter, the speed of advance of which was 3 km/h, the dose of asphalt mixture being 140 kg/m². The number of passes made was 8, with a small amplitude vibration having a frequency of 50 Hz. During compacting, the following temperatures of the BBSG were respected:
on pure bitumen, 140° C. on average for the first grade; and
on bitumen with additives, 100° C. for the other five grades.

The first grade was therefore manufactured at temperatures in accordance with the French standard NF P 98-138 and the other five grades were manufactured at temperatures reduced by 40° C. compared to the first grade. They are therefore warm mixes.

The apparent densities were measured on site using a gamma density probe according to the NF P 98-241-1 standard. The porosities were calculated from the gamma densities. The BBSG temperatures (T) were those measured in the core. The mean values are given in the table below:

| Nature of the bitumen | $T_{aggregate}$ at production (° C.) | $T_{BBSG}$ at laying (° C.) | $T_{BBSG}$ at compacting (° C.) | Average porosity (%) |
|---|---|---|---|---|
| Pure bitumen | 160 | 160 | 140 | 4.2 |
| Pure bitumen | 120 | 120 | 100 | 8.5 |
| Bitumen + Additive 1 (4 kg/t) | 120 | 120 | 100 | 4.8 |
| Bitumen + Additive 2 (4 kg/t) | 120 | 120 | 100 | 5.9 |
| Bitumen + Additive 3 (4 kg/t) | 120 | 120 | 100 | 5.7 |
| Bitumen + Additive 4 (4 kg/t) | 120 | 120 | 100 | 5.6 |

Compared with the porosity limits from the NP P 98-130 standard for 0/10 Class 3 BBSGs, the reference BBSG according to French standard NF P 98-138 and the BBSGs produced according to the present application using additives 1 to 4 are in accordance with the NF P 98-130 standard.

The BBSG produced with the pure bitumen at 120° C. is poorly coated, aggregates appearing to be partially not covered with bitumen, and the porosity is too high. The fluidity of the warm mixes, measured by the inverse w of the porosity, is therefore improved by virtue of the additives 1 to 4 and this fluidity is acceptable relative to the standard.

The invention claimed is:

1. An asphalt mixture comprising
at least aggregate,
at least one bituminous product, and
at least one additive B, wherein the additive B contains at least one compound (B1) of formula:

(R—O-A-)$_c$-P(=O)—OH$_d$ (B1)

where P is the phosphorus atom, c is from 1 to 2, c+d is equal to 3,
A represents a bond or a divalent group comprising at least one oxypropylene (OP) unit and/or at least one oxyethylene (OE) unit; and
R represents a hydrocarbon-based chain having from 1 to 30 carbon atoms, the chain optionally being linear or branched, saturated or unsaturated, the chain optionally containing at least one aromatic or non-aromatic ring; and
the dose of additive(s) B1, per ton of bituminous product, being between 0.3 kg and 20 kg;
wherein the additive B optionally contains phosphoric acid, the dose of phosphoric acid per ton of bituminous product being less than 2 kg;
wherein the additive B optionally contains at least one pyrophosphate of the compound B1, in a dose per ton of bituminous product of less than 20 kg; and
wherein the bituminous product has a difference between the penetration index before contact with the aggregates and the penetration index after extraction of the asphalt mixture of less than 5 tenths of a millimeter for a bitumen having an initial penetration index between 20 and 30 tenths of a millimeter, of less than 15 tenths of a millimeter for a bitumen having an initial penetration index between 35 and 50 tenths of a millimeter, of less than 20 tenths of a millimeter for a bitumen having an initial penetration index between 50 and 70 tenths of a millimeter, of less than 25 tenths of a millimeter for a bitumen having an initial penetration index between 70 tenths of a millimeter and 100 tenths of a millimeter, of less than 50 tenths of a millimeter for a bitumen having an initial penetration index between 160 and 220 tenths of a millimeter.

2. The asphalt mixture as claimed in claim 1, wherein the group A of the compound of formula B1 comprises a divalent group comprising oxypropylene (OP) units and/or oxyethylene (OE) units, said OP/OE units being distributed randomly or in blocks.

3. The asphalt mixture as claimed in claim 1, wherein the group A of the compound of formula B1 comprises a divalent group comprising oxypropylene (OP) units and/or oxyethylene (OE) units, said OP and/or OE units being connected to the phosphorus atom by a single bond, or by a linear or branched hydrocarbon-based chain that comprises one, two or three carbon atoms chain.

4. The asphalt mixture as claimed in claim 1, wherein the compound of formula B1 corresponds to the formula (R—O—(CH$_2$CH(CH$_3$)O)$_a$—(CH$_2$CH$_2$O)$_b$—)$_c$—P(=O)—OH$_d$ wherein b is from 0 to 10, and a is between 0 and 80.

5. The asphalt mixture as claimed in claim 1, wherein the compound of formula B1 corresponds to the formula (R—O—(CH$_2$CH(CH$_3$)O)$_a$—(CH$_2$CH$_2$O)$_b$—)$_c$—P(=O)—OH$_d$ wherein b is from 0 to 10, a represents 0 when R contains at least 10 carbon atoms, and a is between 8 and 80, when R contains less than 10 carbon atoms.

6. The asphalt mixture as claimed in claim 1, wherein the compound of formula B1 is prepared in its entirety or in part from raw materials of renewable origin, wherein the compound of B1 contains an amount of the carbon isotope 14 greater than that of the same compound of formula B1 prepared exclusively from raw materials of fossil origin.

7. The asphalt mixture as claimed in claim 6, wherein in the compound of formula B1, the $^{14}C/^{12}C$ ratio is greater than 0 and less than or equal to around $1.2\times10^{-12}$.

8. A process for preparing an asphalt mixture comprising the physical mixing of aggregates with at least one bituminous product and at least one additive B as claimed in claim 1, wherein the mixing is carried out at temperatures of the fractions of aggregates and bituminous product, whereby an asphalt mixture at a temperature between 60° C. and 200° C. is produced;
and spreading said asphalt mixture on a surface and optionally compacting said asphalt mixture.

9. The process as claimed in claim 8, wherein
(a) for a pure bitumen having a penetration index between 10 and 20:
the temperature of the aggregates during mixing with the bitumen is above 130° C.,
the temperature of the mix of aggregates and bituminous product during spreading is between 120 and 150° C.,
the temperature of the mix of aggregates and bituminous product at the start of compacting, when it takes place, is between 120 and 150° C.;
(b) for a pure bitumen having a penetration index between 20 and 35:
the temperature of the aggregates during mixing with the bitumen is above 120° C.,
the temperature of the mix of aggregates and bituminous product during spreading is between 110 and 135° C.,
the temperature of the mix of aggregates and bituminous product the start of compacting, when it takes place, is between 110° C. and 135° C.;

(c) for a pure bitumen having a penetration index between 35 and 50:
  the temperature of the aggregates during mixing with the bitumen is above 110° C.,
  the temperature of the mix of aggregates and bituminous product during spreading is between 95° C. and 125° C.,
  the temperature of the mix of aggregates and bituminous product at the start of compacting, when it takes place, is between 95° C. and 125° C.;

(d) for a pure bitumen having a penetration index between 50 and 70:
  the temperature of the aggregates during mixing with the bitumen is above 105° C.,
  the temperature of the mix of aggregates and bituminous product during spreading is between 90° C. and 120° C.,
  the temperature of the mix of aggregates and bituminous product at the start of compacting, when it takes place, is between 85° C. and 120° C.;

(e) for a pure bitumen having a penetration index between 70 and 100:
  the temperature of the aggregates during mixing with the bitumen is above 100° C.,
  the temperature of the mix of aggregates and bituminous product during spreading is between 85° C. and 115° C.,
  the temperature of the mix of aggregates and bituminous product at the start of compacting, when it takes place, is between 85° C. and 115° C.;

(f) for a pure bitumen having a penetration index between 100 and 160:
  the temperature of the aggregates during mixing with the bitumen is above 100° C.,
  the temperature of the mix of aggregates and bituminous product during spreading is between 80° C. and 105° C.,
  the temperature of the mix of aggregates and bituminous product at the start of compacting, when it takes place, is between 80° C. and 105° C.;

(g) for a pure bitumen having a penetration index between 160 and 250:
  the temperature of the aggregates during mixing with the bitumen is above 100° C.,
  the temperature of the mix of aggregates and bituminous product during spreading is between 75° C. and 100° C.,
  the temperature of the mix of aggregates and bituminous product at the start of compacting, when it takes place, is between 75° C. and 100° C.;

(h) for a bitumen having a penetration index between 10 and 20 before addition of polymer and containing between 1 and 4% of polymer(s):
  the temperature of the aggregates during mixing with the bitumen is above 150° C.,
  the temperature of the mix of aggregates and bituminous product during spreading is between 145° C. and 175° C.,
  the temperature of the mix of aggregates and bituminous product at the start of compacting, when it takes place, is between 145° C. and 175° C.;

(i) for a bitumen having a penetration index between 20 and 35 before addition of polymer and containing between 1 and 4% of polymer(s):
  the temperature of the aggregates during mixing with the bitumen is above 140° C.,
  the temperature of the mix of aggregates and bituminous product during spreading is between 130° C. and 160° C.,
  the temperature of the mix of aggregates and bituminous product at the start of compacting, when it takes place, is between 130° C. and 160° C.;

(j) for a bitumen having a penetration index between 35 and 50 before addition of polymer and containing between 1 and 4% of polymer(s):
  the temperature of the aggregates during mixing with the bitumen is above 130° C.,
  the temperature of the mix of aggregates and bituminous product during spreading is between 120° C. and 150° C.,
  the temperature of the mix of aggregates and bituminous product at the start of compacting, when it takes place, is between 120° C. and 150° C.;

(k) for a bitumen having a penetration index between 50 and 70 before addition of polymer and containing between 1 and 4% of polymer(s):
  the temperature of the aggregates during mixing with the bitumen is above 120° C.,
  the temperature of the mix of aggregates and bituminous product during spreading is between 115° C. and 140° C.,
  the temperature of the mix of aggregates and bituminous product at the start of compacting, when it takes place, is between 115° C. and 140° C.;

(l) for a bitumen having a penetration index between 70 and 100 before addition of polymer and containing between 1 and 4% of polymer(s):
  the temperature of the aggregates during mixing with the bitumen is above 120° C.,
  the temperature of the mix of aggregates and bituminous product during spreading is between 110° C. and 135° C.,
  the temperature of the mix of aggregates and bituminous product at the start of compacting, when it takes place, is between 110° C. and 135° C.;

(m) for a bitumen having a penetration index between 100 and 160 before addition of polymer and containing between 1 and 4% of polymer(s):
  the temperature of the aggregates during mixing with the bitumen is above 120° C.,
  the temperature of the mix of aggregates and bituminous product during spreading is between 105° C. and 130° C.,
  the temperature of the mix of aggregates and bituminous product at the start of compacting, when it takes place, is between 105° C. and 130° C.;

(n) for a pure bitumen having a penetration index between 160 and 250 before addition of polymer and containing between 1 and 4% of polymer(s):
  the temperature of the aggregates during mixing with the bitumen is above 120° C.,
  the temperature of the mix of aggregates and bituminous product during spreading is between 100° C. and 125° C.,
  the temperature of the mix of aggregates and bituminous product at the start of compacting, when it takes place, is between 100° C. and 125° C.;

(o) for a bitumen having a penetration index between 10 and 20 before addition of polymer and containing between 4 and 8% of polymer(s):
  the temperature of the aggregates during mixing with the bitumen is above 155° C., the temperature of the mix of aggregates and bituminous product during spreading is between 150° C. and 180° C., the temperature of the mix of aggregates and bituminous product at the start of compacting, when it takes place, is between 150° C. and 180° C.;

(p) for a bitumen having a penetration index between 20 and 35 before addition of polymer and containing between 4 and 8% of polymer(s):

the temperature of the aggregates during mixing with the bitumen is above 145° C., the temperature of the mix of aggregates and bituminous product during spreading is between 135° C. and 165° C., the temperature of the mix of aggregates and bituminous product at the start of compacting, when it takes place, is between 135° C. and 165° C.;

(q) for a bitumen having a penetration index between 35 and 50 before addition of polymer and containing between 4 and 8% of polymer(s):

the temperature of the aggregates during mixing with the bitumen is above 135° C., the temperature of the mix of aggregates and bituminous product during spreading is between 125° C. and 155° C., the temperature of the mix of aggregates and bituminous product at the start of compacting, when it takes place, is between 125° C. and 155° C.;

(r) for a bitumen having a penetration index between 50 and 70 before addition of polymer and containing between 4 and 8% of polymer(s):

the temperature of the aggregates during mixing with the bitumen is above 130° C., the temperature of the mix of aggregates and bituminous product during spreading is between 120° C. and 145° C., the temperature of the mix of aggregates and bituminous product at the start of compacting, when it takes place, is between 120° C. and 145° C.;

(s) for a bitumen having a penetration index between 70 and 100 before addition of polymer and containing between 4 and 8% of polymer(s):

the temperature of the aggregates during mixing with the bitumen is above 125° C., the temperature of the mix of aggregates and bituminous product during spreading is between 120° C. and 140° C., the temperature of the mix of aggregates and bituminous product at the start of compacting, when it takes place, is between 115° C. and 140° C.;

(t) for a bitumen having a penetration index between 100 and 160 before addition of polymer and containing between 4 and 8% of polymer(s):

the temperature of the aggregates during mixing with the bitumen is above 125° C., the temperature of the mix of aggregates and bituminous product during spreading is between 115° C. and 135° C., the temperature of the mix of aggregates and bituminous product at the start of compacting, when it takes place, is between 110° C. and 135° C.;

(u) for a pure bitumen having a penetration index between 160 and 250 before addition of polymer and containing between 4 and 8% of polymer(s):

the temperature of the aggregates during mixing with the bitumen is above 125° C., the temperature of the mix of aggregates and bituminous product during spreading is between 110° C. and 130° C., the temperature of the mix of aggregates and bituminous product within the road covering at the start of compacting, when it takes place, is between 105° C. and 130° C.

10. The process as claimed in claim 8, wherein (a) for a pure bitumen having a penetration index between 10 and 20 the temperature of the aggregates during mixing with the bitumen is between 130 and 150° C., the temperature of the mix of aggregates and bituminous product during spreading is between 120 and 150° C., the temperature of the mix of aggregates and bituminous product at the start of compacting, when it takes place, is between 120 and 150° C.;

(b) for a pure bitumen having a penetration index between 20 and 35:

the temperature of the aggregates during mixing with the bitumen is between 120 and 150° C., the temperature of the mix of aggregates and bituminous product during spreading is between 110 and 135° C., the temperature of the mix of aggregates and bituminous product at the start of compacting, when it takes place, is between 110° C. and 135° C.;

(c) for a pure bitumen having a penetration index between 35 and 50:

the temperature of the aggregates during mixing with the bitumen is between 110° C. and 140° C., the temperature of the mix of aggregates and bituminous product during spreading is between 95° C. and 125° C., the temperature of the mix of aggregates and bituminous product at the start of compacting, when it takes place, is between 95° C. and 125° C.;

(d) for a pure bitumen having a penetration index between 50 and 70:

the temperature of the aggregates during mixing with the bitumen is between 105° C. and 135° C., the temperature of the mix of aggregates and bituminous product during spreading is between 90° C. and 120° C., the temperature of the mix of aggregates and bituminous product at the start of compacting, when it takes place, is between 85° C. and 120° C.;

(e) for a pure bitumen having a penetration index between 70 and 100:

the temperature of the aggregates during mixing with the bitumen is between 100° C. and 125° C., the temperature of the mix of aggregates and bituminous product during spreading is between 85° C. and 115° C., the temperature of the mix of aggregates and bituminous product at the start of compacting, when it takes place, is between 85° C. and 115° C.;

(f) for a pure bitumen having a penetration index between 100 and 160:

the temperature of the aggregates during mixing with the bitumen is between 100° C. and 125° C., the temperature of the mix of aggregates and bituminous product during spreading is between 80° C. and 105° C., the temperature of the mix of aggregates and bituminous product at the start of compacting, when it takes place, is between 80° C. and 105° C.;

(g) for a pure bitumen having a penetration index between 160 and 250:
  the temperature of the aggregates during mixing with the bitumen is between 100° C. and 120° C.,
  the temperature of the mix of aggregates and bituminous product during spreading is between 75° C. and 100° C.,
  the temperature of the mix of aggregates and bituminous product at the start of compacting, when it takes place, is between 75° C. and 100° C.;

(h) for a bitumen having a penetration index between 10 and 20 before addition of polymer(s) and containing between 1 and 4% of polymer(s):
  the temperature of the aggregates during mixing with the bitumen is between 150° C. and 180° C.,
  the temperature of the mix of aggregates and bituminous product during spreading is between 145° C. and 175° C.,
  the temperature of the mix of aggregates and bituminous product at the start of compacting, when it takes place, is between 145° C. and 175° C.;

(i) for a bitumen having a penetration index between 20 and 35 before addition of polymer(s) and containing between 1 and 4% of polymer(s):
  the temperature of the aggregates during mixing with the bitumen is between 140° C. and 165° C.,
  the temperature of the mix of aggregates and bituminous product during spreading is between 130° C. and 160° C.,
  the temperature of the mix of aggregates and bituminous product at the start of compacting, when it takes place, is between 130° C. and 160° C.;

(j) for a bitumen having a penetration index between 35 and 50 before addition of polymer(s) and containing between 1 and 4% of polymer(s):
  the temperature of the aggregates during mixing with the bitumen is between 130° C. and 155° C.,
  the temperature of the mix of aggregates and bituminous product during spreading is between 120° C. and 150° C.,
  the temperature of the mix of aggregates and bituminous product at the start of compacting, when it takes place, is between 120° C. and 150° C.;

(k) for a bitumen having a penetration index between 50 and 70 before addition of polymer(s) and containing between 1 and 4% of polymer(s):
  the temperature of the aggregates during mixing with the bitumen is between 120° C. and 150° C.,
  the temperature of the mix of aggregates and bituminous product during spreading is between 115° C. and 140° C.,
  the temperature of the mix of aggregates and bituminous product at the start of compacting, when it takes place, is between 115° C. and 140° C.;

(l) for a bitumen having a penetration index between 70 and 100 before addition of polymer(s) and containing between 1 and 4% of polymer(s):
  the temperature of the aggregates during mixing with the bitumen is between 120° C. and 140° C.,
  the temperature of the mix of aggregates and bituminous product during spreading is between 110° C. and 135° C.,
  the temperature of the mix of aggregates and bituminous product at the start of compacting, when it takes place, is between 110° C. and 135° C.;

(m) for a bitumen having a penetration index between 100 and 160 before addition of polymer(s) and containing between 1 and 4% of polymer(s):
  the temperature of the aggregates during mixing with the bitumen is between 120° C. and 140° C.,
  the temperature of the mix of aggregates and bituminous product during spreading is between 105° C. and 130° C.,
  the temperature of the mix of aggregates and bituminous product at the start of compacting, when it takes place, is between 105° C. and 130° C.;

(n) for a pure bitumen having a penetration index between 160 and 250 before addition of polymer(s) and containing between 1 and 4% of polymer(s):
  the temperature of the aggregates during mixing with the bitumen is between 120° C. and 140° C.,
  the temperature of the mix of aggregates and bituminous product during spreading is between 100° C. and 125° C.,
  the temperature of the mix of aggregates and bituminous product at the start of compacting, when it takes place, is between 100° C. and 125° C.;

(o) for a bitumen having a penetration index between 10 and 20 before addition of polymer(s) and containing between 4 and 8% of polymer(s):
  the temperature of the aggregates during mixing with the bitumen is between 155° C. and 185° C.,
  the temperature of the mix of aggregates and bituminous product during spreading is between 150° C. and 180° C.,
  the temperature of the mix of aggregates and bituminous product at the start of compacting, when it takes place, is between 150° C. and 180° C.;

(p) for a bitumen having a penetration index between 20 and 35 before addition of polymer(s) and containing between 4 and 8% of polymer(s):
  the temperature of the aggregates during mixing with the bitumen is between 145° C. and 170° C.,
  the temperature of the mix of aggregates and bituminous product during spreading is between 135° C. and 165° C.,
  the temperature of the mix of aggregates and bituminous product at the start of compacting, when it takes place, is between 135° C. and 165° C.;

(q) for a bitumen having a penetration index between 35 and 50 before addition of polymer(s) and containing between 4 and 8% of polymer(s):
  the temperature of the aggregates during mixing with the bitumen is between 135° C. and 160° C.,
  the temperature of the mix of aggregates and bituminous product during spreading is between 125° C. and 155° C.,
  the temperature of the mix of aggregates and bituminous product at the start of compacting, when it takes place, is between 125° C. and 155° C.;

(r) for a bitumen having a penetration index between 50 and 70 before addition of polymer(s) and containing between 4 and 8% of polymer(s):
  the temperature of the aggregates during mixing with the bitumen is between 130° C. and 155° C.,
  the temperature of the mix of aggregates and bituminous product during spreading is between 120° C. and 145° C.,
  the temperature of the mix of aggregates and bituminous product at the start of compacting, when it takes place, is between 120° C. and 145° C.;

(s) for a bitumen having a penetration index between 70 and 100 before addition of polymer(s) and containing between 4 and 8% of polymer(s):
  the temperature of the aggregates during mixing with the bitumen is between 125° C. and 145° C.,
  the temperature of the mix of aggregates and bituminous product during spreading is between 120° C. and 140° C.,
  the temperature of the mix of aggregates and bituminous product at the start of compacting, when it takes place, is between 115° C. and 140° C.;

(t) for a bitumen having a penetration index between 100 and 160 before addition of polymer(s) and containing between 4 and 8% of polymer(s):
  the temperature of the aggregates during mixing with the bitumen is between 125° C. and 145° C.,
  the temperature of the mix of aggregates and bituminous product during spreading is between 115° C. and 135° C.,
  the temperature of the mix of aggregates and bituminous product at the start of compacting, when it takes place, is between 110° C. and 135° C.;

(u) for a pure bitumen having a penetration index between 160 and 250 before addition of polymer(s) and containing between 4 and 8% of polymer(s):
  the temperature of the aggregates during mixing with the bitumen is between 125° C. and 145° C.,
  the temperature of the mix of aggregates and bituminous product during spreading is between 110° C. and 130° C.,
  the temperature of the mix of aggregates and bituminous product at the start of compacting, when it takes place, is between 105° C. and 130° C.

11. The process as claimed in claim 8, wherein
(a) for a pure bitumen having a penetration index between 10 and 20:
  the temperature of the aggregates during mixing with the bitumen is between 135° C. and 150° C.,
  the temperature of the mix of aggregates and bituminous product during spreading is between 125° C. and 145° C.,
  the temperature of the mix of aggregates and bituminous product at the start of compacting, when it takes place, is between 125° C. and 145° C.;

(b) for a pure bitumen having a penetration index between 20 and 35:
  the temperature of the aggregates during mixing with the bitumen is between 125° C. and 135° C.,
  the temperature of the mix of aggregates and bituminous product during spreading is between 115° C. and 125° C.,
  the temperature of the mix of aggregates and bituminous product at the start of compacting, when it takes place, is between 105° C. and 125° C.;

(c) for a pure bitumen having a penetration index between 35 and 50:
  the temperature of the aggregates during mixing with the bitumen is between 115° C. and 125° C.,
  the temperature of the mix of aggregates and bituminous product during spreading is between 105° C. and 115° C.,
  the temperature of the mix of aggregates and bituminous product at the start of compacting, when it takes place, is between 95° C. and 105° C.;

(d) for a pure bitumen having a penetration index between 50 and 70:
  the temperature of the aggregates during mixing with the bitumen is between 105° C. and 115° C.,
  the temperature of the mix of aggregates and bituminous product during spreading is between 95° C. and 105° C.,
  the temperature of the mix of aggregates and bituminous product at the start of compacting, when it takes place, is between 85° C. and 95° C.;

(e) for a pure bitumen having a penetration index between 70 and 100:
  the temperature of the aggregates during mixing with the bitumen is between 100° C. and 105° C.,
  the temperature of the mix of aggregates and bituminous product during spreading is between 85° C. and 95° C.,
  the temperature of the mix of aggregates and bituminous product at the start of compacting, when it takes place, is between 85° C. and 95° C.;

(f) for a pure bitumen having a penetration index between 100 and 160:
  the temperature of the aggregates during mixing with the bitumen is between 100° C. and 105° C.,
  the temperature of the mix of aggregates and bituminous product during spreading is between 85° C. and 95° C.,
  the temperature of the mix of aggregates and bituminous product at the start of compacting, when it takes place, is between 85° C. and 95° C.;

(g) for a pure bitumen having a penetration index between 160 and 250:
  the temperature of the aggregates during mixing with the bitumen is between 100° C. and 105° C.,
  the temperature of the mix of aggregates and bituminous product during spreading is between 80° C. and 85° C.,
  the temperature of the mix of aggregates and bituminous product at the start of compacting, when it takes place, is between 80° C. and 85° C.;

(h) for a bitumen having a penetration index between 10 and 20 before addition of polymer(s) and containing between 1 and 4% of polymer(s):
  the temperature of the aggregates during mixing with the bitumen is between 150° C. and 180° C.,
  the temperature of the mix of aggregates and bituminous product during spreading is between 145° C. and 175° C.,
  the temperature of the mix of aggregates and bituminous product at the start of compacting, when it takes place, is between 145° C. and 175° C.;

(i) for a bitumen having a penetration index between 20 and 35 before addition of polymer(s) and containing between 1 and 4% of polymer(s):
  the temperature of the aggregates during mixing with the bitumen is between 140° C. and 150° C.,
  the temperature of the mix of aggregates and bituminous product during spreading is between 130° C. and 145° C.,
  the temperature of the mix of aggregates and bituminous product at the start of compacting, when it takes place, is between 130° C. and 145° C.;

(j) for a bitumen having a penetration index between 35 and 50 before addition of polymer(s) and containing between 1 and 4% of polymer(s):
  the temperature of the aggregates during mixing with the bitumen is between 130° C. and 140° C., the temperature of the mix of aggregates and bituminous product during spreading is between 120° C. and 130° C.,
the temperature of the mix of aggregates and bituminous product at the start of compacting, when it takes place, is between 120° C. and 130° C.;
(k) for a bitumen having a penetration index between 50 and 70 before addition of polymer(s) and containing between 1 and 4% of polymer(s):
the temperature of the aggregates during mixing with the bitumen is between 120° C. and 130° C.,
the temperature of the mix of aggregates and bituminous product during spreading is between 115° C. and 120° C.,
the temperature of the mix of aggregates and bituminous product at the start of compacting, when it takes place, is between 110° C. and 120° C.;
(l) for a bitumen having a penetration index between 70 and 100 before addition of polymer(s) and containing between 1 and 4% of polymer(s):
the temperature of the aggregates during mixing with the bitumen is between 120° C. and 130° C.,
the temperature of the mix of aggregates and bituminous product during spreading is between 115° C. and 120° C.,
the temperature of the mix of aggregates and bituminous product at the start of compacting, when it takes place, is between 110° C. and 120° C.;
(m) for a bitumen having a penetration index between 100 and 160 before addition of polymer(s) and containing between 1 and 4% of polymer(s):
the temperature of the aggregates during mixing with the bitumen is between 120° C. and 130° C.,
the temperature of the mix of aggregates and bituminous product during spreading is between 105° C. and 115° C.,
the temperature of the mix of aggregates and bituminous product at the start of compacting, when it takes place, is between 105° C. and 110° C.;
(n) for a pure bitumen having a penetration index between 160 and 250 before addition of polymer(s) and containing between 1 and 4% of polymer(s):
the temperature of the aggregates during mixing with the bitumen is between 120° C. and 130° C.,
the temperature of the mix of aggregates and bituminous product during spreading is between 105° C. and 115° C.,
the temperature of the mix of aggregates and bituminous product at the start of compacting, when it takes place, is between 100° C. and 105° C.;
(o) for a bitumen having a penetration index between 10 and 20 before addition of polymer(s) and containing between 4 and 8% of polymer(s):
the temperature of the aggregates during mixing with the bitumen is between 165° C. and 185° C.,
the temperature of the mix of aggregates and bituminous product during spreading is between 155° C. and 180° C.,
the temperature of the mix of aggregates and bituminous product at the start of compacting, when it takes place, is between 155° C. and 180° C.;
(p) for a bitumen having a penetration index between 20 and 35 before addition of polymer(s) and containing between 4 and 8% of polymer(s):
the temperature of the aggregates during mixing with the bitumen is between 155° C. and 165° C.,
the temperature of the mix of aggregates and bituminous product during spreading is between 145° C. and 155° C.,
the temperature of the mix of aggregates and bituminous product at the start of compacting, when it takes place, is between 145° C. and 155° C.;
(q) for a bitumen having a penetration index between 35 and 50 before addition of polymer(s) and containing between 4 and 8% of polymer(s):
the temperature of the aggregates during mixing with the bitumen is between 145° C. and 155° C.,
the temperature of the mix of aggregates and bituminous product during spreading is between 135° C. and 145° C.,
the temperature of the mix of aggregates and bituminous product at the start of compacting, when it takes place, is between 130° C. and 145° C.;
(r) for a bitumen having a penetration index between 50 and 70 before addition of polymer(s) and containing between 4 and 8% of polymer(s):
the temperature of the aggregates during mixing with the bitumen is between 135° C. and 145° C.,
the temperature of the mix of aggregates and bituminous product during spreading is between 125° C. and 135° C.,
the temperature of the mix of aggregates and bituminous product at the start of compacting, when it takes place, is between 125° C. and 130° C.;
(s) for a bitumen having a penetration index between 70 and 100 before addition of polymer(s) and containing between 4 and 8% of polymer(s):
the temperature of the aggregates during mixing with the bitumen is between 125° C. and 135° C.,
the temperature of the mix of aggregates and bituminous product during spreading is between 120° C. and 125° C.,
the temperature of the mix of aggregates and bituminous product at the start of compacting, when it takes place, is between 120° C. and 125° C.;
(t) for a bitumen having a penetration index between 100 and 160 before addition of polymer(s) and containing between 4 and 8% of polymer(s):
the temperature of the aggregates during mixing with the bitumen is between 125° C. and 135° C.,
the temperature of the mix of aggregates and bituminous product during spreading is between 115° C. and 120° C.,
the temperature of the mix of aggregates and bituminous product at the start of compacting, when it takes place, is between 115° C. and 120° C.;
(u) for a pure bitumen having a penetration index between 160 and 250 before addition of polymer(s) and containing between 4 and 8% of polymer(s):
the temperature of the aggregates during mixing with the bitumen is between 125° C. and 135° C.,
the temperature of the mix of aggregates and bituminous product during spreading is between 110° C. and 115° C.,
the temperature of the mix of aggregates and bituminous product at the start of compacting, when it takes place, is between 110° C. and 115° C.

12. The process as claimed in claim 8, wherein the additive B are is sprayed onto the aggregates, before and/or during the addition of the bituminous product.

13. The process as claimed in claim 8, wherein the additive B is added to the bituminous product upstream of the zone for mixing the aggregates and bituminous product.

14. A surface, road covering, pavement, cycle path, playground, parking area or aircraft runway completely or partly covered with at least one asphalt mixture obtained as claimed in the process of claim 8.

15. A method of reducing the operating temperature of mixing, spreading and/or compacting an asphalt mixture which comprises adding to an asphalt mixture comprising at least one aggregate and at least one bituminous product, at least one additive B, wherein the additive B contains at least one compound (B1) of formula:

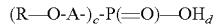 (B1)

wherein P is the phosphorus atom, c is from 1 to 2, c+d is equal to 3, A represents a bond or a divalent group comprising at least one oxypropylene (OP) unit and/or at least one oxyethylene (OE) unit; and R represents a hydrocarbon-based chain having from 1 to 30 carbon atoms, the chain optionally being linear or branched, saturated or unsaturated, the chain optionally containing at least one aromatic or non-aromatic ring; and the dose of additive B1, per ton of bituminous product being between 0.3 kg and 20 kg.

* * * * *